United States Patent
Mohd Mohdi et al.

(10) Patent No.: US 9,295,086 B2
(45) Date of Patent: Mar. 22, 2016

(54) METHOD FOR OPERATING A RADIO COMMUNICATION DEVICE IN A MULTI-WATCH MODE

(71) Applicant: MOTOROLA SOLUTIONS, INC., Schaumburg, IL (US)

(72) Inventors: Intan Mazlina Mohd Mohdi, Bayan Lepas (MY); Yeebing Hong, Penang (MY); Lee Ling Lim, Sungai Ara (MY); Mohd Shafrol Mohamad Razali, Seberang Jaya (MY); Syed Isa Syed Idrus, Bayan Lepas (MY); Ting Fook Tang, Penang (MY); Wai Kong Yau, Bayan Lepas (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 204 days.

(21) Appl. No.: 14/014,534

(22) Filed: Aug. 30, 2013

(65) Prior Publication Data
US 2015/0065186 A1 Mar. 5, 2015

(51) Int. Cl.
*H04B 7/00* (2006.01)
*H04W 76/00* (2009.01)
*H04W 4/10* (2009.01)

(52) U.S. Cl.
CPC .............. *H04W 76/005* (2013.01); *H04W 4/10* (2013.01)

(58) Field of Classification Search
CPC .. H04W 72/005; H04W 76/002; H04W 84/08
See application file for complete search history.

(56) References Cited

U.S. PATENT DOCUMENTS

| | | |
|---|---|---|
| 5,218,668 A | 6/1993 | Higgins et al. |
| 5,231,699 A | 7/1993 | Tendler |
| 6,023,676 A | 2/2000 | Erell |
| 6,766,294 B2 | 7/2004 | MacGinite et al. |

(Continued)

FOREIGN PATENT DOCUMENTS

| | | |
|---|---|---|
| EP | 835015 A2 | 4/1998 |
| EP | 609102 B1 | 10/1999 |

(Continued)

OTHER PUBLICATIONS

PCT International Search Report Dated Feb. 4, 2015 for Counterpart Application PCT/US2014/049746.

*Primary Examiner* — Edward Urban
*Assistant Examiner* — Mohammed Rachedine
(74) *Attorney, Agent, or Firm* — Daniel R. Bestor

(57) ABSTRACT

A method for operating a radio communication device in a multi-watch mode is provided. The radio communication device receives communications on a primary channel and at least one non-primary channel. Further, a talk-back channel is enabled to respond to communications received on the primary channel. The radio communication device determines whether there is any transmission activity in response to a communication received on the non-primary channel. The radio communication device further determines whether the communication received on the non-primary channel comprises critical information when there is no transmission activity for a pre-defined time period since the communication was received on the non-primary channel. When the radio communication device determines that the communication received on the primary channel comprises critical information, the radio communication device switches to the talk-back channel to respond to communications received on the non-primary channel.

14 Claims, 9 Drawing Sheets

(56) References Cited

U.S. PATENT DOCUMENTS

| | | | |
|---|---|---|---|
| 6,850,609 B1 | 2/2005 | Schrage | |
| 6,993,290 B1 | 1/2006 | Gebis et al. | |
| 7,343,288 B2 | 3/2008 | Geppert et al. | |
| 2003/0169181 A1 | 9/2003 | Taylor | |
| 2004/0181597 A1* | 9/2004 | Ekl | H04L 1/16 709/227 |
| 2009/0276214 A1* | 11/2009 | Chong | H04W 76/005 704/235 |
| 2009/0295565 A1* | 12/2009 | Oh | H04L 12/1845 340/539.11 |
| 2010/0137015 A1 | 6/2010 | Blanco | |
| 2011/0026903 A1 | 2/2011 | Singh et al. | |
| 2013/0157634 A1 | 6/2013 | McDonald et al. | |
| 2013/0172037 A1 | 7/2013 | Rema et al. | |

FOREIGN PATENT DOCUMENTS

| | | |
|---|---|---|
| EP | 1054387 A2 | 11/2000 |
| EP | 1054389 A2 | 11/2000 |
| EP | 1054390 A2 | 11/2000 |
| WO | 2009134589 A2 | 11/2009 |
| WO | 2011100120 A1 | 8/2011 |

* cited by examiner

US 9,295,086 B2

METHOD FOR OPERATING A RADIO COMMUNICATION DEVICE IN A MULTI-WATCH MODE

FIELD OF THE DISCLOSURE

The present disclosure relates generally to operations of communication devices and more particularly to two-way radio communication devices operating in a multi-watch mode.

BACKGROUND

Radios such as hand-held two-way radios are utilized within a variety of public safety environments, such as law enforcement, fire rescue, and emergency medical environments to name a few. Currently, public safety personnel working in the field use two physical radios in order to monitor more than one channel at a time. However, using two radios can be cumbersome, and managing the communications from two radios independently can be challenging and may lead to confusion. Using two radios can even be more challenging during potentially critical situations as communications on such radios may comprise critical information and therefore may require quicker response or acknowledgment from incident commanders. In such situations, it is possible that an incident commander may miss critical information received on a particular radio when handling both radios simultaneously.

Accordingly, there is a need for an improved means for managing communications during a potential critical situation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
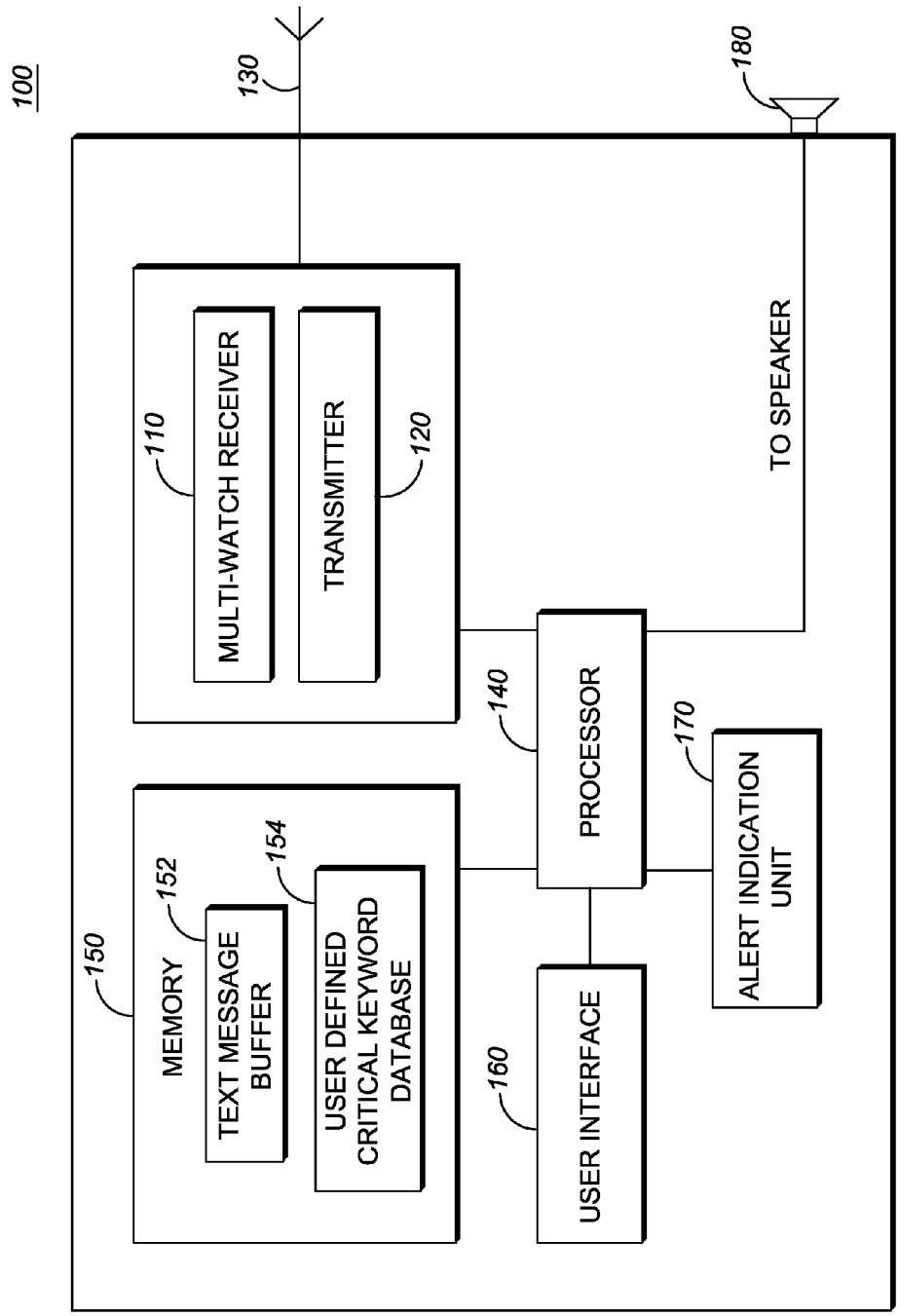
FIG. 1 is a block diagram of a radio communication device in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, in accordance with the various embodiments, there is described herein, a method for operating a radio communication device. The radio communication device is operated to receive communications on a plurality of channels during a multi-watch mode of operation. The plurality of channels includes a primary channel and at least one non-primary channel. Further, a talk-back channel is enabled to respond to communications received on the primary channel. The radio communication device determines whether there is any transmission activity in response to a communication received on the non-primary channel. The radio communication device further determines whether the communication received on the non-primary channel comprises critical information when there is no transmission activity in the radio communication device for a pre-defined time period since the communication was received on the non-primary channel. When the radio communication device determines that the communication received on the primary channel comprises critical information, the radio communication device switches to the talk-back channel to respond to communications received on the non-primary channel. This switching of the talk-back channel to respond to communications received on the non-primary channel allows an incident commander to readily acknowledge the communication received on the non-primary channel in a potentially critical situation.

FIG. 1 is a block diagram of a radio communication device 100 operating in accordance with various embodiments. The radio communication device 100 may be one of a two-way communication radio, a remote speaker microphone (RSM) accessory coupled to the handheld two-way communication radio, or other collaborative electronic accessory device operating with a multi-watch capable radio. The radio communication device 100 comprises a multi-watch receiver 110 and transmitter 120 coupled to at least one antenna 130, a processor 140, a memory 150 for storing operating instructions that are executed by the processor 140, user interface 160, alert indication unit 170 and at least one speaker 180.

In accordance with the various embodiments of the present disclosure, the radio communication device 100 operates in a multi-watch mode during which the multi-watch receiver 110 simultaneously receives communications over at least two communication channels including a primary channel and at least one non-primary channel (also referred to as secondary channel). In accordance with the embodiments of the present disclosure, during the multi-watch mode of operation in which the radio communication device 100 simultaneously receives communications on more than one channel, the radio communication device 100 is keyed up or configured to provide higher priority to one channel over another channel. As used herein, the term 'higher priority' signifies the default configurability of the radio communication device 100 to readily manage and control communications (including responding to such communications) associated with one particular channel when compared to other channels that have "lower priority." In accordance with the embodiments of the present disclosure, the radio communication device 100, by default, is keyed up or configured to have higher priority for the primary channel and lower priority for the non-primary channel. For example, the radio communication device 100, by default, is keyed-up to respond to communications received on the primary channel instead of the non-primary channel whenever a user (incident commander) instructs the radio communication device 100 to switch to a talk back channel, for example, using a push-to-talk (PTT) call switch/interface. Similarly, by default, an audio associated with the communication received on the non-primary channel is either muted or played at a volume (via speaker 180) which is lower than a volume of an audio played for the communication received on the primary channel. Further, the functionality of the controls in the user interface 160 of the radio communication device 100, by default, are associated with the primary channel instead of the non-primary channel so that a user input at the controls in the user interface 160 results in controlling one or more operational parameters associated with the primary channel instead of the operational parameters associated with the non-primary channel. The embodiments of the present disclosure can be advantageously applied to override the above default configuration of the radio communication device 100 whenever the radio communication device 100 determines that a communication associated with the non-primary channel comprises critical information. This overriding of default configuration will switch the priority configuration between the primary channel and the non-primary channel so that the non-primary channel will have the "higher priority" to allow the radio communication device 100 to readily manage and control communications (including responding to such communications) associated with the non-primary channel. This setting of overriding of default configuration is maintained until the radio communication device 100 is instructed to switch to the default configuration of having "higher priority" for primary channel.

The radio communication device 100 is an integrated unit containing at least all the elements depicted in FIG. 1 for operating in multi-watch mode. Alternatively, the radio communication device 100 can comprise a collection of appropriately interconnected unit or devices, wherein such units or devices perform functions that are equivalent to the functions performed by the components of the radio communication device 100. The multi-watch receiver 110 of the radio communication device 100 is configured to receive radio frequency (RF) signals through at least two communication channels via at least one antenna 130. In this regard, the multi-watch receiver 110, the transmitter 120, and the at least one antenna 130 include appropriate circuitry to enable digital or analog communications over a wireless communication channel. Further, the at least one antenna 130 includes any known or developed structure for receiving electromagnetic energy in the RF spectrum. In accordance with various embodiments, the multi-watch receiver 110 is capable of being tuned to receive communications simultaneously from a plurality of communication channels comprising the primary channel and the non-primary channel via the at least one antenna 130. For example, when the multi-watch receiver is configured as a dual-watch receiver, the radio communication device 100 receives communication from two channels, a primary channel and a non-primary channel. The transmitter 120 is configured by default to be tuned to a talk-back channel to respond to communications received on a primary channel when a PTT switch/interface in the radio communication device 100 is depressed or activated. In accordance with the various embodiments, the above configuration of transmitter 120 can be overridden such that it can be tuned to a talk-back channel to respond to communications received on the non-primary channel when it is determined that a communication received on the non-primary channel comprises critical information.

As used herein, the term "critical information" represents a word or combination of set of words that are likely to occur in voice communications during a potential critical situation (or emergency situations). For example, words such as "man trapped/down", "roof collapse", "prisoner escape", "explosion", "mayday", "help", and "attention" are typical keywords that are often used in communication scenarios involving emergency responders such as policemen and firefighters. The words used in the communication may vary depending upon the context of the critical situation. Further, the terms "primary channel" and "non-primary channel" refer to any two different channels of one or more communication systems. In one embodiment, the two different channels may be from a single communication system, such as a public safety-long term evolution (PS-LTE) communication system or a land mobile radio communication (LMR) system. In another embodiment, each of these two different channels may be selected from a different communication system, for example, the primary channel can be selected from a first communication system such as the LMR system, and the non-primary channel can be selected from a second communication system such as the PS-LTE system. The multi-watch receiver 110 simultaneously monitors wireless communications on both the primary channel and the non-primary channel(s) and routes received communications to at least one speaker 180. In some embodiments, the multi-watch receiver 110 simultaneously monitors wireless communications on both the primary channel and the secondary channel using a single receiving antenna. In another embodiment, the multi-watch receiver 110 periodically toggles to monitor communications on the primary and the secondary channels using a single receiving antenna. In some other embodiments, the multi-watch receiver 110 simultaneously monitors wireless communications on the primary and secondary channels using more than one antenna. Other antenna arrangements are also feasible.

The processor 140 of the radio communication device 100 includes one or more microprocessors, microcontrollers, DSPs (digital signal processors), state machines, logic circuitry, or any other device or devices that process information based on operational or programming instructions stored in the memory 150. In accordance with the embodiments of the present disclosure, the processor 140 is configured to determine whether the communication received on the non-primary channel comprises critical information when it determines that there is no transmission activity in the radio communication device 100 for a pre-defined time period since a communication was received on the non-primary channel. The processor further switches to the talk-back channel to enable the user to respond to communications received on the non-primary channel when it determines that the communication received on the non-primary channel comprises critical information. The memory 150 can be an IC (integrated circuit) memory chip containing any form of RAM (random-access memory), a floppy disk, a CD-RW (compact disk with read write), a hard disk drive, a DVD-RW (digital versatile disc with read write), a flash memory card, external subscriber identity module (SIM) card or any other medium for storing digital information. One of ordinary skill in the art will recognize that when the processor 140 has one or more of its functions performed by a state machine or logic circuitry, the memory 150 containing the corresponding operational instructions can be embedded within the state machine or logic circuitry.

The memory 150 comprises a text message buffer 152 that temporarily stores one or more voice communications received on the non-primary channel in the form of text messages. In accordance with the embodiment of the present disclosure, the processor 140 converts a voice communication received on the non-primary channel into a text message and stores the text message in the text message buffer 152. In one embodiment, each text message stored in the text message buffer 152 is also associated with a timestamp, talkgroup identification (ID), and a tag. The timestamp represents a time of arrival of a particular voice communication at the radio communication device 100 and the talkgroup ID identifies the talkgroup to which the sender of the voice communication is subscribed. The text message is also further associated with a user ID that uniquely identifies a device (or sender) from which the voice communication has originated. The tag for each text message stored in the text message buffer 152 is either marked with status "new" or "processed". In one embodiment, the processor 140 after converting a voice communication into a text message marks the converted text message with a status "new". The status "new" indicates that the text message has not been processed or scanned. Therefore, if there is at least one other text message associated with another voice communication on the non-primary channel is subsequently stored in the text message buffer 152 within a predefined scanning period, then the radio communication device 100 will not scan the already "processed" text message. The "processed" text message represents those converted text messages for which there are no defined keywords matching with user-defined keywords. Table '1' below illustrates an example of data stored in the text message buffer 152.

TABLE 1

| Converted speech/voice to text | Sender/Talkgroup ID | Timestamp | Tag |
|---|---|---|---|
| The roof seems to collapse | 1 | 10.25:28 | "new" |
| I saw a man trapped at the 5$^{th}$ floor. | 2 | 10:25:28 | "new" |
| Man in BLUE shirt is breaching the safety line. | 3 | 10:25:26 | "processed" |
| Man in BLUE shirt is breaching the safety line. | 3 | 10:10:23 | "processed" |

The memory 150 further maintains a user defined critical keyword database 154 that includes a list of pre-defined keywords representing critical information. The pre-defined keywords stored in the user defined critical keyword database 154 include either a single keyword or a combination of set of two or more keywords. A 'single keyword' indicates one particular keyword stored in the database that can potentially match with a corresponding word of a particular text message stored in the text message buffer 152. A combination of set of two or more keywords, for example, can include a 'first keyword' and a 'second keyword' that can potentially match a corresponding first and second word of a particular text message stored in the text message buffer 152. Tables '2' and '3' below illustrate examples of some of the single keywords and combination of first and second keyword listed in the user defined critical keyword database 154.

TABLE 2

| Single Keyword |
|---|
| Mayday |
| Help |
| Attention |

TABLE 3

| First Keyword | Second Keyword |
|---|---|
| Man | Trapped |
| Prisoner | Escape |
| Child | Hurt |
| Big | explosion |
| Man | Down |

In accordance with the embodiments of the present disclosure, the data stored in the text message buffer 152 and user defined critical keyword database 154 are used to perform critical information detection for the communication received on the non-primary channel. In one embodiment, a keyword scanning algorithm (FIG. 3) is used to perform critical information detection for the communication received on the non-primary channel based on a comparison between the words stored in the text message buffer 152 and the list of pre-defined keywords (both single keyword and combination of set of keywords) stored in the user defined critical keyword database 154. In a further embodiment, a repeatability pattern detection algorithm (FIGS. 5A and 5B) is used to perform critical information detection on communication received on the non-primary channel based on comparing the timestamp and talkgroup ID (or user ID) of the text message of a current communication stored in the text message buffer 152 with timestamp and talkgroup ID (or user ID) of at least one other text message of a previous communication stored in the text message buffer 152. In the repeatability pattern detection algorithm, the content of the text message of the current communication is further compared to the content of the previous communication to determine if the communication received on the non-primary channel contains critical information based on the similarity between the contents.

The user interface 160 of the radio communication device 100 includes one or more input/output interfaces such as keypad(s), display(s), volume control interface(s), encryption on/off interface(s), push-to-talk (PTT) call switch/interface, and/or microphone(s). In accordance with the various embodiments, the radio communication device 100 additionally comprises the alert indication unit 170. The alert indication unit 170 of the radio communication device 100 comprises one or more of a light emitting diode (LED) and a speaker. The alert indication unit 170 is activated to provide a visual or audible alert to a user of the radio communication device 100 or an incident commander that a potentially critical event has occurred whenever the radio communication device 100 detects that the communication received on the non-primary channel comprises critical information. In one embodiment, the alert is presented to the user in the form of an audio beep. In another embodiment, the alert is presented to the user in the form of a blinking LED from a plurality of LEDs present on the radio communication device 100. Other alert means are also feasible.

Figure 2:
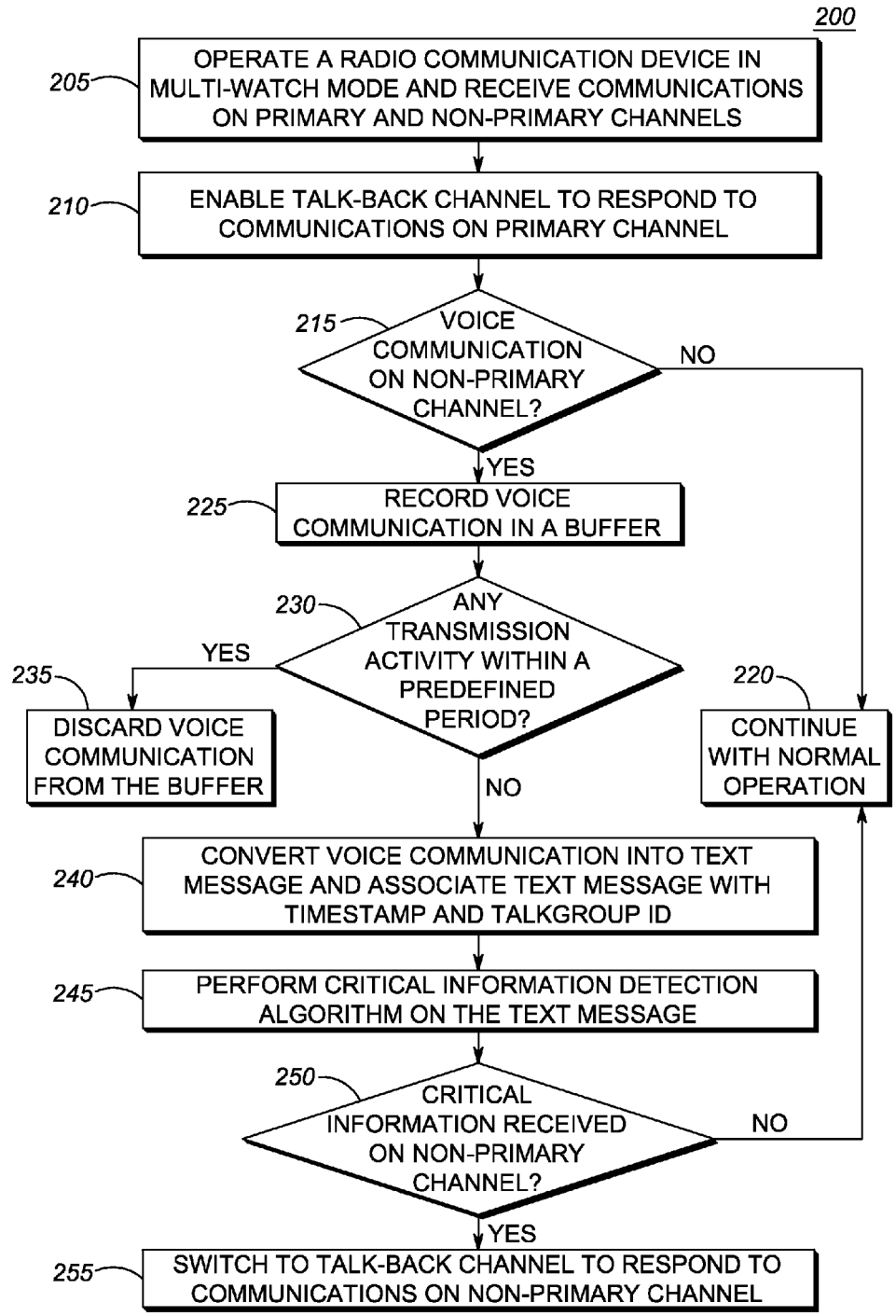
FIG. 2 is a flowchart illustrating a method of operating a radio communication device in accordance with the various embodiments.

FIG. 2 is a flowchart illustrating a method 200 for operating the radio communication device 100 of FIG. 1 in accordance with the various embodiments. At 205, the radio communication device 100 operates in a multi-watch mode during which the radio communication device 100 receives communications on the primary channel and the non-primary channel. In embodiments of the present disclosure, the radio communication device 100 receives (and plays) the communications simultaneously on both the primary channel and the non-primary channel. As shown in 210, the radio communication device 100 is configured, by default, to enable the talk-back channel to respond to the communications on the primary channel. This default configuration allows the radio communication device 100 to automatically identify the channel (primary channel in this case) for which the response is required whenever the radio communication device 100 is instructed to switch to the talk-back channel, for example, by a user via a PTT call switch/interface. In one embodiment, the radio communication device 100 is also configured, by default, to mute or play an audio associated with the communication on the non-primary channel at a volume which is lower than a volume of an audio played for the communication received on the primary channel, and further associate controls of at least one user interface 160 with the primary channel for controlling one or more operational parameters pertaining to the primary channel. This default configuration allows the radio communication device 100 to readily manage the volume settings and also control the various operational parameters associated with communication received on the primary channel.

At 215, the radio communication device 100 determines the type of communication received on the non-primary channel and more particularly determines if the communication received on the non-primary channel is a voice communication. The radio communication device 100 proceeds to continue with its normal operation if it determines that the communication is a data communication. On the other hand, if the radio communication device 100 determines that the communication received on the non-primary channel is a voice communication, then the radio communication device 100 proceeds to 225 where the voice communication is recorded in a text message buffer 152. Next, at 230, the radio communication device 100 determines if there is any transmission activity in the radio communication device 100 in response to the communication received on the non-primary channel. In one embodiment, the radio communication device 100 sets a timer whenever a communication is received on the non-primary channel and checks for a pre-defined time period whether there is any transmission activity in the radio communication device 100. In one embodiment, the radio communication device 100 detects a presence or absence of transmission activity based on whether a PTT call switch is activated or not. If the radio communication device 100 detects a transmission activity within the pre-defined time period, then the radio communication device 100 discards the recorded voice communication from the text message buffer 152. In this case, the radio communication device 100 assumes that the user has already responded to or is currently responding to the communication received on the non-primary channel and therefore discards the recorded voice communication from the text message buffer 152 as it does not require further processing for critical information detection. Otherwise, if the radio communication device 100 determines that there is no transmission activity for the pre-defined time period since the communication was received on the non-primary channel, then at 240, the radio communication device 100 converts the recorded voice communication in the text message buffer 152 into a text message and marks the newly converted voice communication to text message as "new". Further, as shown in 240, the radio communication device 100 associates the text message with additional information comprising at least a timestamp of arrival of the communication on the non-primary channel and a talkgroup ID identifying a talkgroup to which the sender of the communication is registered. In one embodiment, the text message is also further associated with a user ID that uniquely identifies a device (or sender) from which the voice communication has originated.

At 245, the radio communication device 100 performs critical information detection algorithm on the text message to determine if the text message representing the voice communication received on the non-primary channel comprises critical information. In accordance with the embodiments of the present disclosure, a keyword scanning algorithm described in detail with reference to FIG. 3 and repeatability pattern detection algorithm described in detail with reference to FIGS. 5A and 5B may be used to determine if the communication received on the non-primary channel comprises critical information. In keyword scanning algorithm, the radio communication device 100 extracts one or more keywords from the text message stored in the text message buffer 152 and compares the extracted one or more keywords with one or more keywords stored in the user defined critical keyword database 154. If the extracted one or more keywords match with a single keyword or a combination of set of keywords, then the radio communication device 100 determines that the communication received on the non-primary channel comprises critical information. In repeatability pattern detection algorithm, the timestamp and talkgroup ID of the text message is compared with a timestamp and talkgroup ID of at least one other text message stored in the text message buffer 152, where the at least one other text message may represent another voice communication previously received on the non-primary channel and stored on the text message buffer 152. In this algorithm, when the radio communication device 100 determines that the difference between the two timestamps is smaller than a threshold value, and further the talkgroup ID of the text message matches with the talkgroup ID of the at least one other text message, the radio communication device 100 further compares the content of the text message with the at least one other text message. If the content of the text message correlates with or similar to the content of the at least one other text message, then the radio communication device 100 determines that the communication received on the non-primary channel comprises critical information. In one embodiment, the content of one text message is said to be similar or correlated to another text message when at least some of the words in one text message matches (literally or synonymously or contextually) with another text message.

Returning to 245, the radio communication device 100 after performing critical information detection algorithm proceeds to 250 and determines whether the communication received on the non-primary channel comprises critical information. In one embodiment, as shown in 255, the radio communication device 100 switches to the talk-back channel to respond to communications received on the non-primary channel when the communication received on the non-primary channel comprises critical information. Otherwise, if the radio communication device 100 does not detect critical information on the non-primary channel, the radio communication device 100 continues with its normal operations 220 where the radio communication device 100 will maintain its default configuration of enabling the talk-back channel to respond to communication on the primary channel whenever a PTT call switch is activated. In one embodiment, when the radio communication device 100 determines that the communication received on the non-primary channel comprises critical information, the radio communication device 100 switches the audio associated with the communication on the non-primary channel to play at a volume which is higher than the volume of the audio played for the communication received on the primary channel and further switches functionality of the controls of the at least one user interface in the radio communication device 100 to control one or more operational parameters pertaining to the non-primary channel. In one embodiment, the operational parameter comprises one or more of a volume parameter and a PTT call placing parameter such that when the radio communication device 100 determines that the communication received on the non-primary channel comprises critical information, the radio communication device 100 switches functionality of the volume control interface to the non-primary channel for controlling volume of communications received on the non-primary channel and further switches functionality of the PTT call switch/interface to the non-primary channel for placing a PTT call via a talk-back channel to respond to communications received on the non-primary channel.

Figure 3:
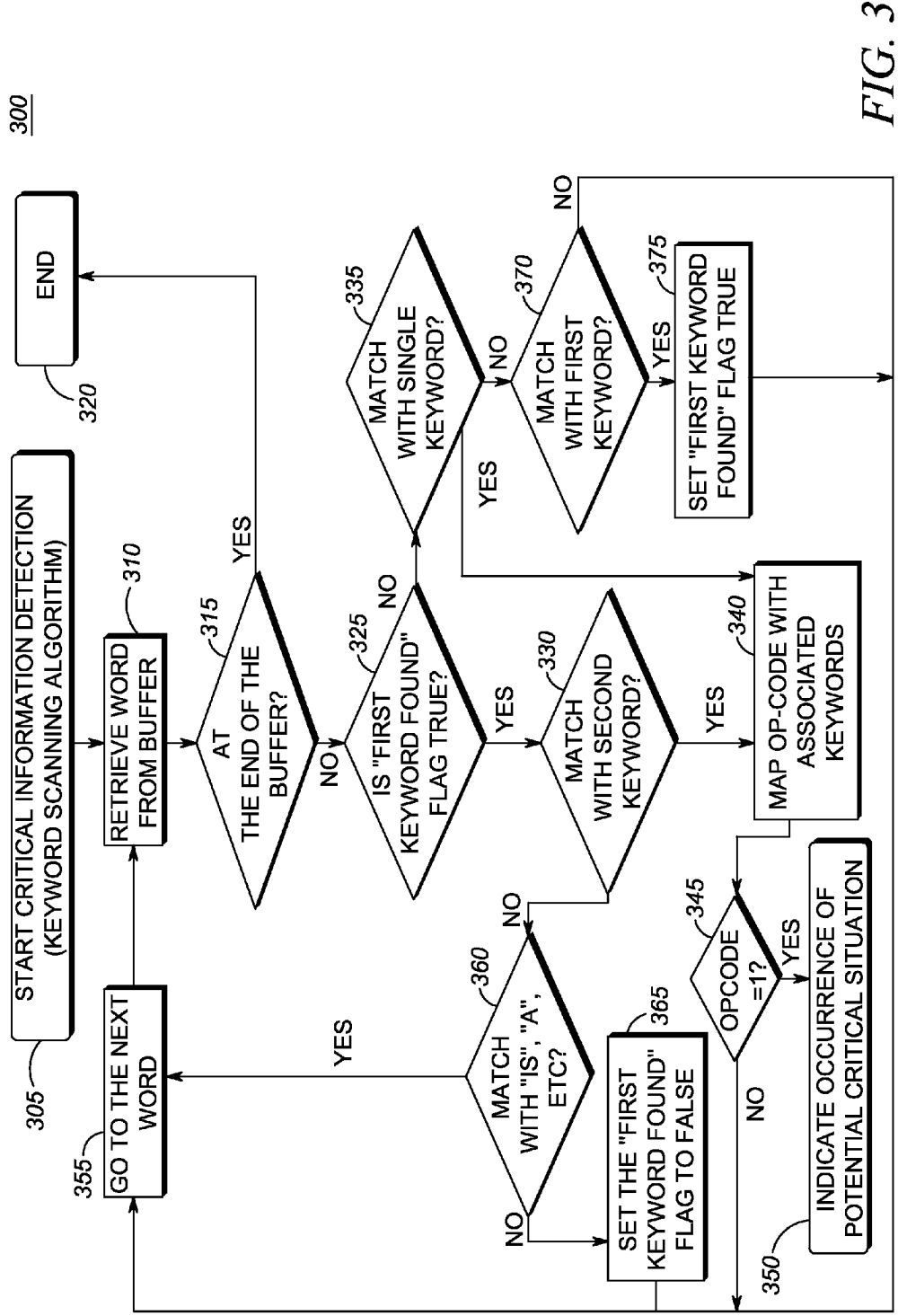
FIG. 3 is a flowchart illustrating a method of operating a radio communication device to perform critical information detection using keyword scanning algorithm in accordance with the various embodiments.

FIG. 3 is a flowchart illustrating a method 300 of operating a radio communication device 100 to perform critical information detection using keyword scanning algorithm in accordance with the various embodiments of the present disclosure. The method 300 is initiated at 305 when a radio communication device 100 proceeds to perform critical information detection for the communication received on the non-primary channel using keyword scanning algorithm. At 305, the radio communication device 100 retrieves a word from the text message buffer 152. In accordance with the embodiments of the present disclosure, the radio communication device 100 sequentially scans the words stored in the text message buffer 152 and retrieves one word at a time for comparison with the user-defined keywords listed in the user defined critical keyword database 154. Next, at 315, the radio communication device 100 determines if the end of the text message buffer 152 is reached, i.e., the radio communication device 100 determines if it has scanned all the words in the text message buffer 152 for a potential match with a single keyword or combination of set of keywords listed in the user defined critical keyword database 154. If the end of the text message buffer 152 is reached, the radio communication device 100 terminates (END) the algorithm as shown in 320 and continues with its normal operations. Otherwise, the radio communication device 100 at 325 checks if a flag "First keyword found" is set to be 'TRUE'. In accordance with embodiments of the present disclosure, a flag "First keyword found" set to 'TRUE' indicates that a previously scanned keyword matches with a 'first keyword' in a set of keywords listed in the user defined critical keyword database 154. Otherwise, if the flag "First keyword found" is set to 'FALSE', it represents that there are no previously scanned keywords that matches with both a 'first keyword' and a 'second keyword' in a set of keywords listed in the user defined critical keyword database 154. If the radio communication device 100 determines that a flag "First keyword found" is set to TRUE, then the radio communication device 100 checks at 330 whether the retrieved word matches with a 'second keyword' in the set of keywords listed in the user defined critical keyword database 154. If the radio communication device 100 determines at 330 that the retrieved word matches with a 'second keyword', then the radio communication device 100 at 340 maps an op-code value associated with the 'second keyword' that matches with the retrieved word. Returning to 325, if the radio communication device 100 determines that the flag for the "First keyword found" is not TRUE (i.e. if the flag is FALSE), then the radio communication device 100 at 335 checks whether the retrieved word matches with any 'single keyword' listed in the user defined critical keyword database 154. If the radio communication device 100 determines at 335 that the retrieved word matches with a 'single keyword', then the radio communication device 100 at 340 maps the text message currently being scanned to an op-code value associated with the 'single keyword' that matches with the retrieved word.

In accordance with the embodiments of the present disclosure, each of the scanned keyword and combined set of keywords are mapped to a specific op-code value. If the scanned text message carries an op-code value of 0, then the scanned text message will be tagged as 'processed'. Otherwise, if the op-code value carried by the scanned text message is 1, then this raises a critical or important message flag indicating to a user that a potential critical situation has occurred that requires a overriding of the default configuration of the radio communication device 100 or switching of the priority configuration between the primary channel and the non-primary channel. For example, scanned keywords such as "man down" or "help" are associated with an op-code value of 1 indicating that the communication in which these scanned keywords were carried comprises critical information, whereas scanned keywords such as "man" or "prisoner" are associated with an op-code value of 0 to indicate that these scanned keywords does not identify a message that was communicated during a potential critical situation. The radio communication device 100 at 345 verifies if the text message carries an op-code value of 1. If the op-code value is 1, then the radio communication device 100 proceeds to indicate to the user that a potential critical situation has occurred, for example, via an alert indication unit 170 as shown in 350. If the op-code value is 0, the radio communication device 100 proceeds to check for the next word in the text message as shown in 355.

Returning to 330, if the radio communication device 100 determines that the retrieved word does not match with any 'second keyword' listed in the user defined critical keyword database 154, then the radio communication device 100 further determines at 360 if the retrieved word merely represents a connecting word such as "is", "a", "are", "and" etc used in building or completing a phrase or sentence. If the retrieved word represents a connecting word, then the radio communication device 100 proceeds to check for the next word as shown in 355. Otherwise, the radio communication device 100 at 365 sets the flag for "First keyword found" to be FALSE to indicate that the retrieved word does not match with both the 'first keyword' and 'second keyword' listed in the user defined critical keyword database 154. Subsequently, the radio communication device 100 proceeds to check for the next word as shown in 355.

Returning to 335, if the radio communication device 100 determines that the retrieved word does not match with any 'single keyword' listed in the user defined critical keyword database 154, then the radio communication device 100 at 370 further checks if the retrieved word matches with a first keyword and if there is a match, then the radio communication sets the flag for 'First keyword found" to be TRUE as shown in 375. In this case, the radio communication device 100 proceeds to check for the next word as shown in 355. Accordingly, the keyword scanning algorithm as described above can be used by the radio communication device 100 to sequentially scan each word stored in the text message buffer 152 to determine if such scanned words potentially match with either a 'single keyword' or a combination of set of keywords listed in the database for the purpose of determining whether a particular voice communication comprises critical information.

Figure 4A:
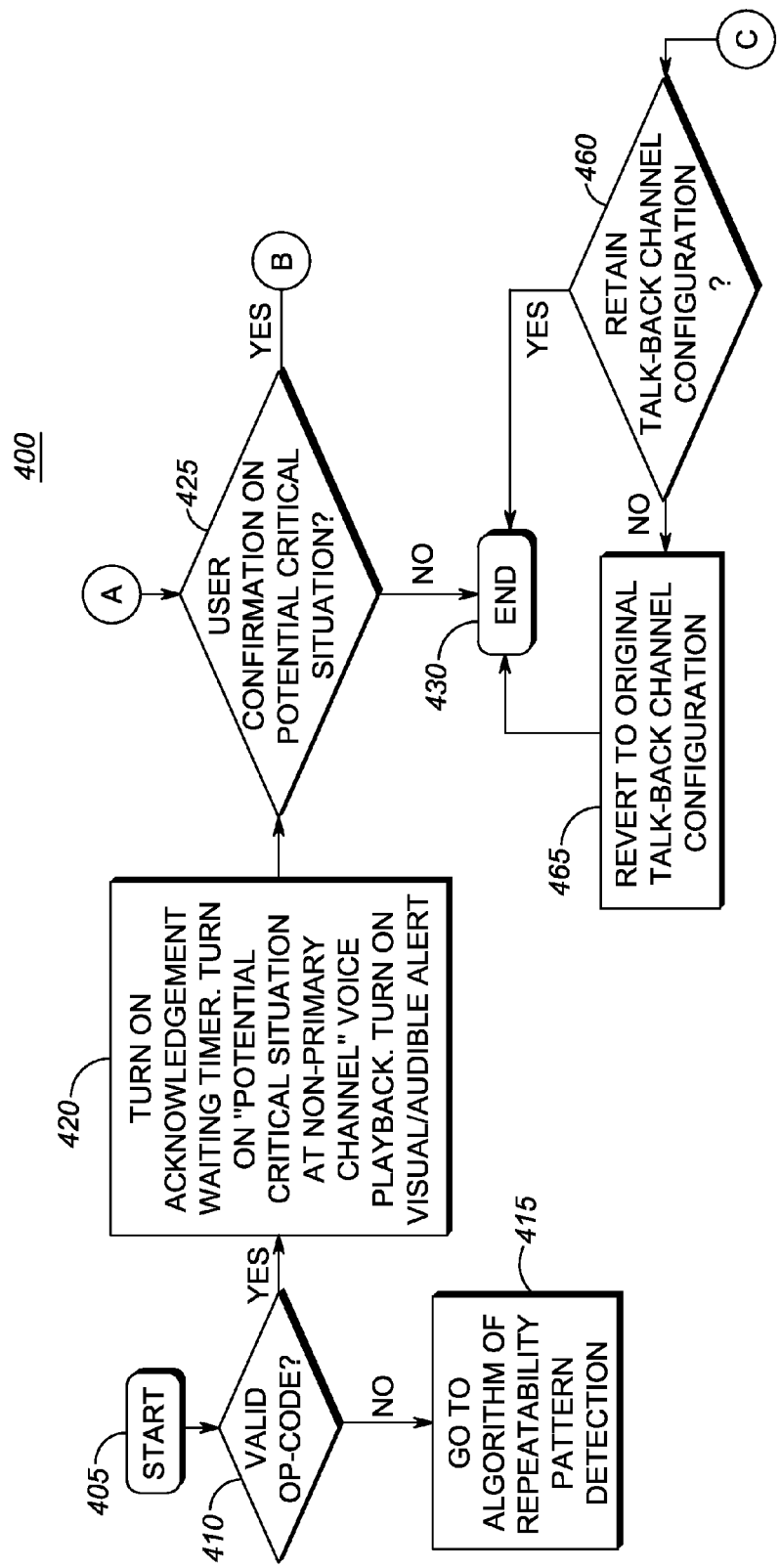
FIGS. 4A and 4B is a flowchart illustrating a method performed in the radio communication device when critical information is detected in communications received on a non-primary channel in accordance with the various embodiments.
Figure 4B:
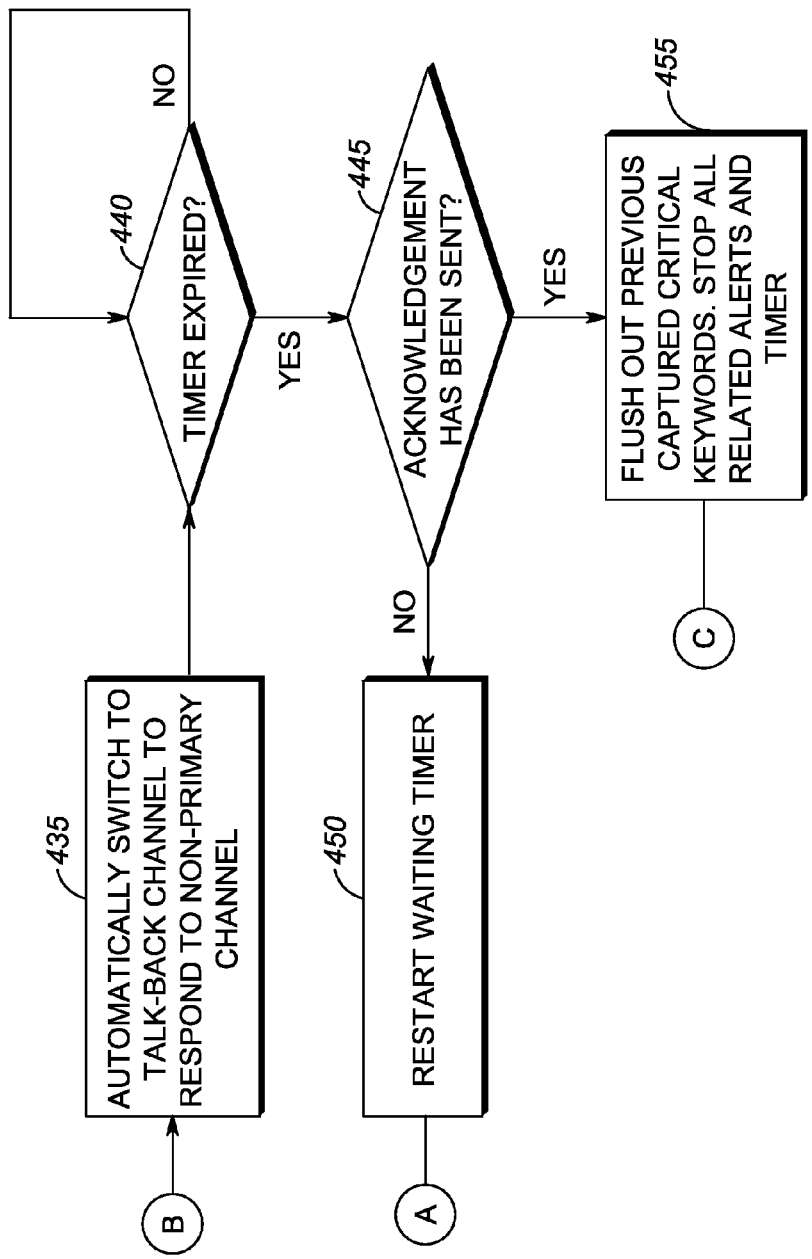

FIGS. 4A and 4B is a flowchart illustrating a method 400 performed in the radio communication device 100 when critical information is detected in communications received on a non-primary channel in accordance with the various embodiments of the present disclosure. The method 400 of the radio communication device 100 is initiated at 405 when the radio communication device 100 has completed performing the critical information detection for a particular text message stored in the text message buffer 152 using the keyword scanning algorithm. Next, at 410, the radio communication device 100 determines if the execution of the keyword scanning algorithm for a particular text message has resulted in a valid op-code value. If the op-code value is not valid (i.e. op-code value is 0), then the radio communication device 100 proceeds to 415 to execute the repeatability pattern detection algorithm (FIGS. 5A and 5B) that provides an alternative way of determining if the particular text message (that was previously scanned using the keyword scanning algorithm) contains critical information. Otherwise, if the radio communication device 100 determines that that the op-code value for the text message is valid (i.e. op-code value is 1), then the radio communication device 100 turns on an acknowledgment waiting timer and also turns on the alert indication unit 170 to provide a visual or audible alert to a user indicating that a potential critical situation has occurred based on the detection of the critical information in the communication received on the non-primary channel at 420.

Next, at 425, the radio communication device 100 checks if it has received a response/confirmation from the user on the occurrence of the potential critical situation. If no response/confirmation is received, then the radio communication device 100 ends the method 400 at 430 and continues with its normal operations. Otherwise, if the radio communication device 100 receives a confirmation at the user interface 160 on the occurrence of the potential critical situation, then the radio communication device 100 overrides its default configuration and in one embodiment, automatically switches to a talk-back channel to respond to communications on the non-primary channel as shown in 435 when a PTT call switch is activated. In this embodiment, the radio communication device 100 was configured by default to switch to a talk-back channel to respond to communications only on the primary channel when a PTT switch is activated. However, a confirmation at the user interface 160 on the occurrence of the potential critical situation overrides this default configuration so that the radio communication device 100 can now respond to critical information received on the non-primary channel. In another embodiment, the radio communication device 100 also overrides its other default configurations in response to the occurrence of the potential critical situation, such as switching the audio associated with the communication received on the non-primary channel to play at a volume which is higher than the volume of the audio played for the communication received on the non-primary channel or switching functionality of the controls of the user interface 160 to control one or more operations parameters pertaining to the non-primary channel.

Next at 440, the radio communication device 100 checks if the acknowledgment waiting timer has expired. When the timer expires, the radio communication device 100 checks in 445 if any acknowledgment to the communication received on the non-primary channel has been sent on the talk-back channel in response to the potential critical situation. If the acknowledgment has been already sent on the talk-back channel, then the radio communication device 100 at 455 flushes out all previously captured critical keywords from the text message buffer i.e. discards the text message corresponding to the voice communication received on the non-primary channel, and further deactivates the alert indication unit 170 and stops the acknowledgment waiting timer. In one embodiment, the radio communication device 100 turns on the acknowledgment waiting timer when the radio communication device 100 switches to the talk-back channel for responding to communications on the non-primary channel, and if is determined that a pre-defined time period since the acknowledgment waiting timer is turned on has expired, then the radio communication device discards the recorded voice communication from the text message buffer 152. If no acknowledgment is sent in response to the potential critical situation, the radio communication device 100 restarts the acknowledgment waiting timer and once again waits for user confirmation on the occurrence of the potential critical situation as shown in 425.

Next, at 460, the radio communication device 100 checks if the talk-back channel configuration needs to be retained. In one embodiment, the radio communication device 100 may wait for a pre-defined period of time to check if it has received any input at the user interface and decide if the talk-back channel configuration needs to be retained. Alternatively, the radio communication device 100 may be configured by default to either retain the talk-back channel configuration at 465 or revert to the original talk-back channel configuration. Accordingly, the radio communication device 100 reverts to the original or default talk-back channel configuration of responding to communication on the primary channel if it receives an instruction not to retain the configuration and ends the method 400 at 430 to continue with its normal operation. Otherwise, the radio communication device 100 retains the talk-back channel configuration of responding to communication on the non-primary channel and ends the method 400 at 430 to continue with its normal operations.

Figure 5A:
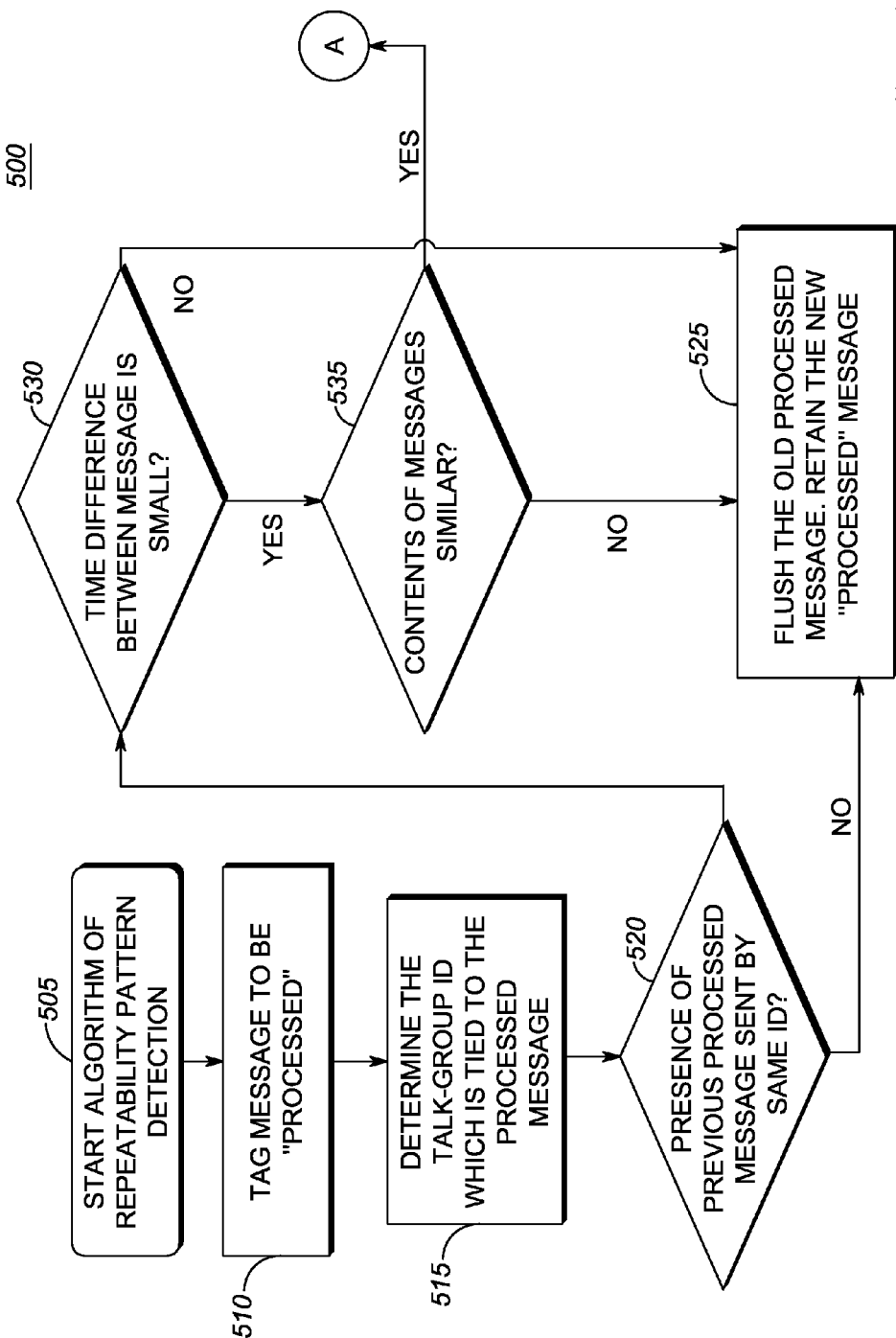
FIGS. 5A and 5B is a flowchart illustrating a method of operating a radio communication device to perform critical information detection using repeatability pattern detection algorithm in accordance with the various embodiments.
Figure 5B:
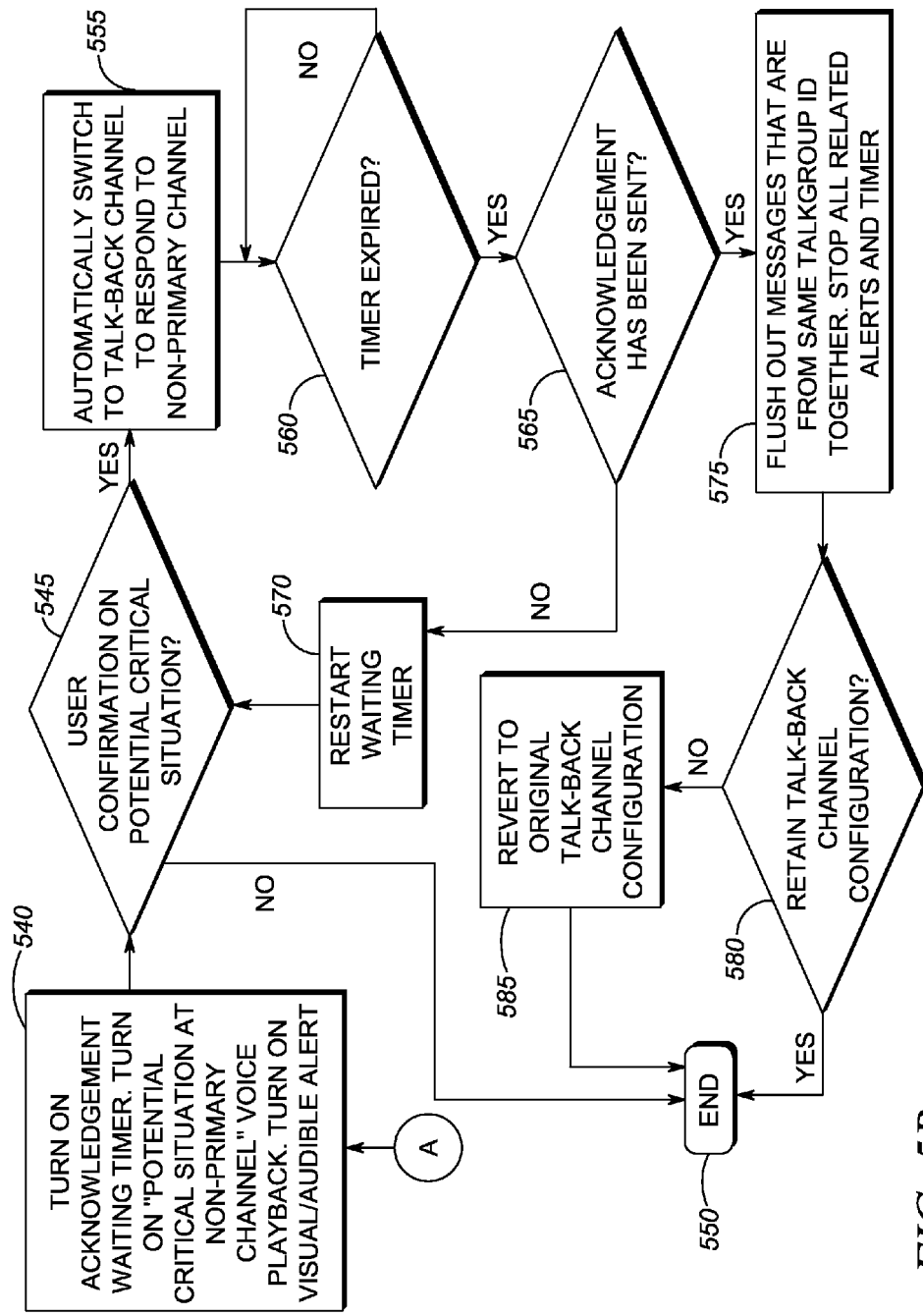

FIGS. 5A & 5B is a flowchart illustrating a method 500 of operating a radio communication device 100 to perform critical information detection using repeatability pattern detection algorithm in accordance with the various embodiments of the present disclosure. In one embodiment, the execution of the repeatability pattern algorithm by the radio communication device 100 is initiated at 505 when the radio communication device 100 determines that a text message stored in the text message buffer 152 corresponding to a voice communication received on a non-primary channel does not have a valid op-code value based on the execution of the keyword scanning algorithm. At 510, the radio communication device 100 tags the text message that is currently being scanned as "processed". Next, at 515, the radio communication device 100 determines the talk-group ID of the processed message. Next, at 520, the radio communication device 100 checks whether there are any previously "processed" text messages (corresponding to voice communications previously received on the non-primary channel) that are stored in the text message buffer 152 with the same talkgroup ID. If there are no previously "processed" text messages with same talkgroup ID, then the radio communication device 100 flushes (discards) the previously "processed" text messages and retains the currently "processed" text message. Otherwise, if there are any previously "processed" text message with the same talkgroup ID, then the radio communication device 100 further checks at 530 whether the time difference between the two messages is small. In one embodiment, the radio communication device 100 compares the timestamp of the previously "processed" message with the timestamp of the currently "processed" text message. If the difference between the timestamps is smaller than a threshold value, then the radio communication device at 535 further compares the content of the "previously processed" message with the content of the currently "processed" message to determine if the content of messages is similar or correlated. In one embodiment, the content of one text message is said to be similar or correlated to another text message when at least some of the words in one text message matches (literally or synonymously or contextually) with another text message. If the contents of the messages is not similar or correlated, then the radio communication device 100 proceeds to 525 where the previously processed text messages are flushed out from the text message buffer 152 and the currently "processed" text message is retained in the text message buffer 152.

Returning to 535, if the radio communication device 100 determines that the contents of previously "processed" message and currently "processed" message are similar or correlated, then the radio communication device 100 assumes that the currently "processed" message represents critical information based on a small time difference between the currently "processed" message and the previously "processed message" with the same talkgroup ID. Next, at 540, the radio communication device 100 turns on an acknowledgment waiting timer and also turns on the alert indication unit 170 to provide a visual or audible alert to a user indicating that a potential critical situation has occurred based on the critical information detected on the communication received in the non-primary channel. Next, at 545, the radio communication device 100 checks if it has received a response/confirmation from the user on the occurrence of the potential critical situation. If no response is received, the radio communication device 100 ends the method 500 at 550 and continues with its normal operations. In one embodiment, when the radio communication device 100 detects that a potential critical situation has occurred, the radio communication device 100 is configured to directly override its default configuration without a need for confirmation from the user. Otherwise, if the radio communication device 100 receives a confirmation at a user interface on the occurrence of the potential critical situation, then the radio communication device 100 overrides its default configuration, and in one embodiment, automatically switches to a talk-back channel to respond to communications on the non-primary channel as shown in 555. In this embodiment, the radio communication device 100 is configured by default to switch to a talk-back channel to respond to communications only on the primary channel. However, a confirmation at the user interface on the occurrence of the potential critical situation overrides this default configuration so that the radio communication device 100 can now respond to critical information received on the non-primary channel. In another embodiment, the radio communication device 100 also overrides its other default configurations in response to the occurrence of the potential critical situation, such as switching the audio associated with the communication received on the non-primary channel to play at a volume which is higher than the volume of the audio played for the communication received on the non-primary channel or switching functionality of the controls of the user interface 160 to control one or more operations parameters pertaining to the non-primary channel.

Next at 560, the radio communication device 100 checks if the acknowledgment waiting timer has expired. When the timer expires, the radio communication device 100 checks in 565 if any acknowledgment to the communication received on the non-primary channel has been sent on the talk-back channel in response to the potential critical situation. If the acknowledgment is already sent on the talk-back channel, then the radio communication device 100 at 575 discards all text messages with same talkgroup ID from the text message buffer 152. The radio communication device 100 also deactivates the alert indication unit 170 and stops the acknowledgment waiting timer at 575. If no acknowledgment is sent in response to the potential critical situation, the radio communication device 100 restarts the acknowledgment waiting timer and once again waits for user confirmation on the occurrence of the potential critical situation as shown in 545.

Next, at 580, the radio communication device 100 checks if the talk-back channel configuration needs to be retained. In one embodiment, the radio communication device 100 may wait for a predefined period of time to check if it has received any input at the user interface to decide if the talk-back channel configuration needs to be retained. Alternatively, the radio communication device 100 may be configured by default to either retain the talk-back channel configuration or revert to the original or default talk-back channel configuration. Accordingly, the radio communication device 100 at 585 reverts to the original or default talk-back channel configuration if it receives an instruction not to retain the configuration and ends the method 500 at 550 to continue with its normal operation. Otherwise, the radio communication device 100 retains the talk-back channel configuration of responding to communication on the non-primary channel and ends the method 500 at 550 to continue with its normal operations.

Figure 6A:
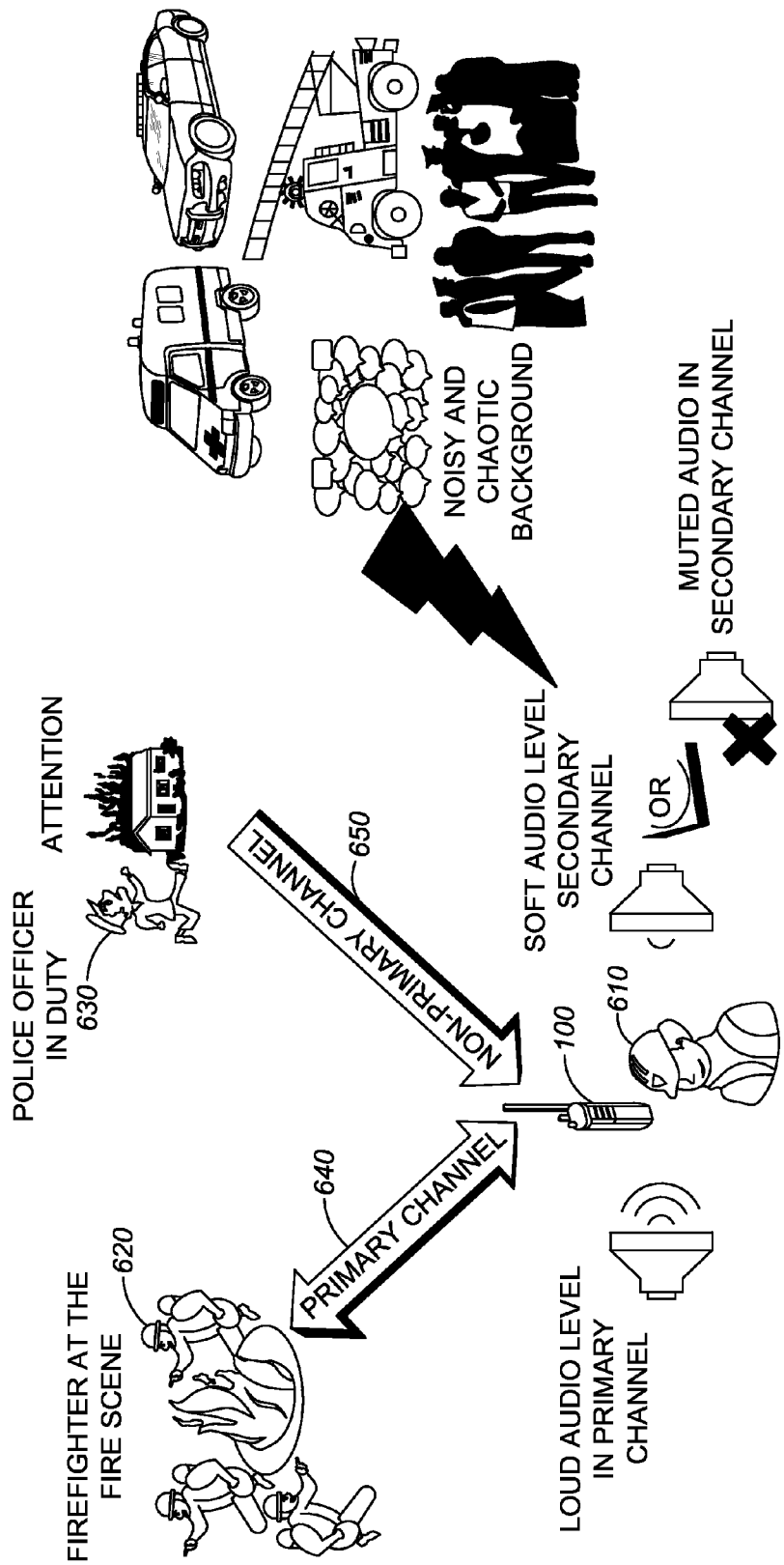
FIGS. 6A and 6B illustrates a communication scenario involving a potential critical situation in which the embodiments of the present disclosure can be advantageously applied.
Figure 6B:
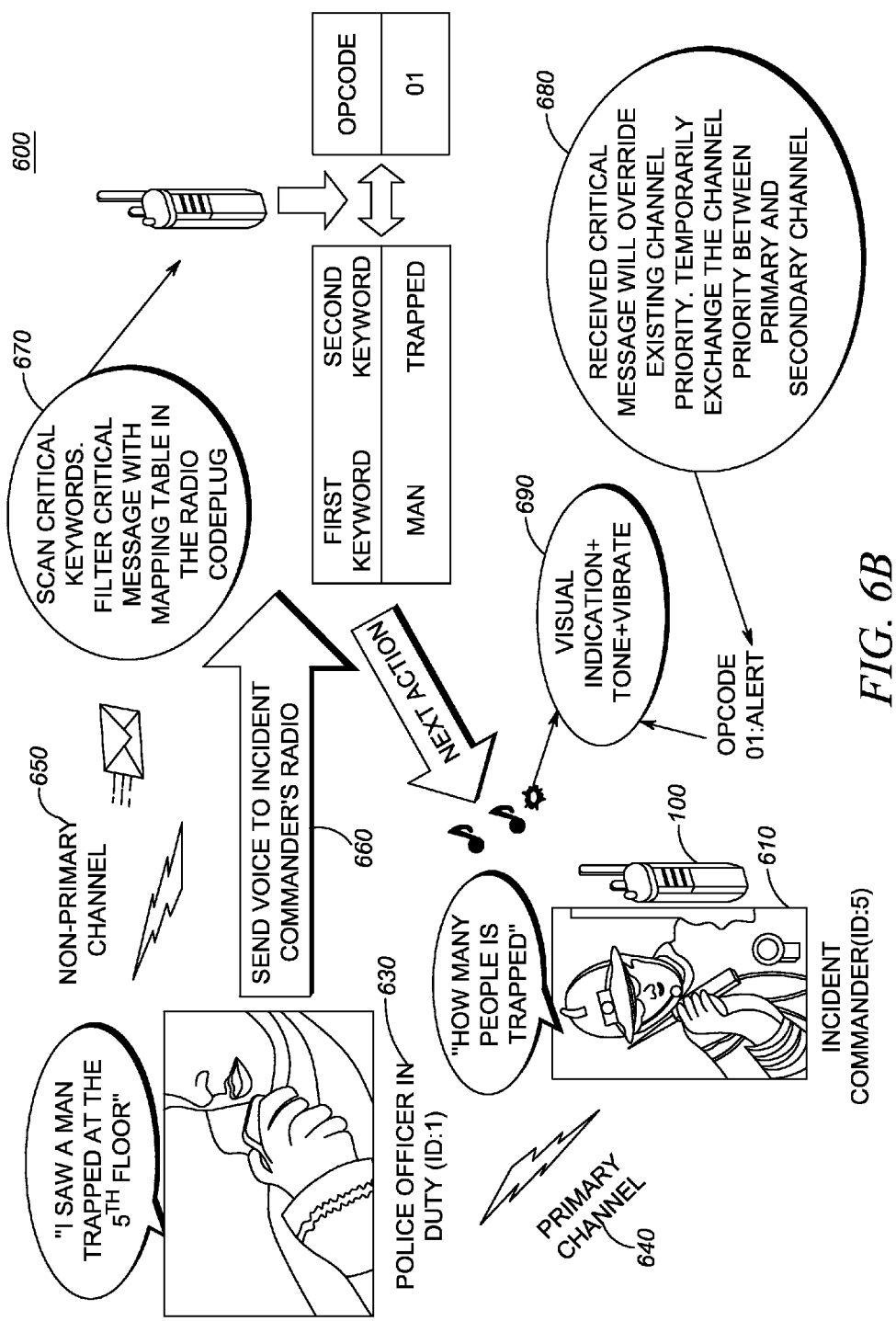

FIGS. 6A and 6B illustrate a communication scenario 600 involving a potential critical situation in which the embodiments of the present disclosure can be advantageously applied. As illustrated in FIG. 6A, an incident commander 610 on the fire ground uses a multi-watch radio, for example radio communication device 100, to receive call from firefighters 620 and police officer 630 who are involved in a tactical operation. If both primary channel 640 and non-primary channel 650 are active at the time of the operation, then the incident commander 610 may receive calls from both firefighter and police officer groups. In accordance with some embodiments, the multi-watch radio 100 is configured by default to either mute or make the audio level softer for communications being received on the non-primary channel 650. This default configuration is used to avoid mixed audio playback from communications received from both the primary channel 640 and non-primary channel 650. The multi-watch radio 100 of FIG. 6A further comprises the multi-watch management features provided by the various embodiments described in FIGS. 1 through 5 to provide automated override capability of the mute/soft audio control. In accordance with the various embodiments, the default configuration of muting or making the audio level softer for communications being received on the non-primary channel 650 can be overridden either when critical information is detected in the communications received on the non-primary channel 650 or in response to an user input received at the multi-watch radio 100.

Now referring to FIG. 6B, let's assume that a police officer 630 just obtained information that someone is trapped in a certain location and need to be rescued as soon as possible by a firefighter 620. While the mute/soften audio functions provided in multi-watch radio 100 for communications received on the non-primary channel 650 allow the public safety officers to listen to one channel (primary channel 640) at a time, the application of the various embodiments to multi-watch radio 100 provides a further advantage to public safety officers enabling them to monitor both communication channels at a time and acknowledge critical information received on non-primary channel 650 as well. This application of the various embodiments to the multi-watch radio 100 is described below.

If the multi-watch radio 100 used by the incident commander 610 were configured by default (as shown in FIG. 6A) to either mute or make the audio level softer for communications being received on the non-primary channel, the incident commander 610 might not be able to listen attentively to communication from the police officer 630 on the non-primary channel 650. So, the incident commander 610 might not be able to acknowledge the potential emergency or critical information in a timely manner, and therefore the incident commander 610 may miss the critical information and make wrong decision in this emergency situation. However, the various embodiments of the present disclosure can be advantageously applied to this communication scenario so that the multi-watch radio 100 carried by the incident commander 610 automatically detects that the communication received on the non-primary channel 650 comprises critical information. The implementation of the various embodiments also allows the incident commander 610 to readily respond to or acknowledge the communications received on the non-primary channel 650 and further help the incident commander 610 to manage the potential critical situation by overriding some of the default configurations in the multi-watch radio 100. The voice communication received from the police officer 630 on the non-primary channel 650 is sent 660 to the incident commander's radio, where the voice communication is converted into text message and further the text message is scanned 670 for critical keywords.

In this example, the phrase "man trapped" is compared with a set of keywords listed in the user defined critical keyword database 154 shown in FIG. 1. The phrase "man trapped" matches with a combination of keywords listed in the user-defined critical keyword database (see TABLE '3') and therefore the scanned text message is associated with an op-code value of '1'. Since the op-code value of the text message "I saw a man trapped at the $5^{th}$ floor" is 1, the text message represents critical information and accordingly, the incident commander's radio will override 680 its existing channel priority configuration and temporarily exchange the channel priority between the primary and non-primary channel. The incident commander's radio 100 also generates an alert 690 to indicate to the incident commander 610 that a potential critical situation has occurred based on the detection of the critical information in the communication received on the non-primary channel. This alert will allow the incident commander to be aware of the occurrence of the potential critical situation, so that when the incident commander 610 activates a PTT call switch on the multi-watch radio 100, the incident commander's radio 100 overrides its default configuration described in FIG. 6A to switch to a talk-back channel to enable the incident commander 610 to readily respond to the communication received on the non-primary channel. In this scenario, as shown in FIG. 6B, the incident commander 610 is immediately able to respond to the communication received from the police officer 630 on the non-primary channel with a message "how many people is trapped."

Accordingly, the implementation of the various embodiments of the present disclosure allows incident commanders to communicate with two different talk groups over two different channels simultaneously and still able to detect emergency communications received on a non-primary channel that is either muted or played with a softer audio. The present disclosure also allows incident commanders to readily acknowledge or respond to communications received on the non-primary channel by having a talk-back channel automatically switched to respond to communications on the non-primary channel when an occurrence of the potential critical situation is detected.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a radio communication device, the method comprising:
   operating the radio communication device to simultaneously receive communications on a plurality of channels comprising a first communication on a primary channel and a second voice communication on a non-primary channel during a multi-watch mode of operation;

enabling a talk-back channel to, by default, respond to communications received on the primary channel when a push-to-talk (PTT) switch is activated;

recording the second voice communication in a text message buffer and converting the recorded second voice communication into a text message;

determining whether there is any transmission activity in the radio communication device;

determining, based on a content of the text message, whether the second voice communication received on the non-primary channel comprises critical information when there is no transmission activity in the radio communication device for a pre-defined time period since the communication was received on the non-primary channel; and in response to determining that the second voice communication received on the non-primary channel comprises critical information, switching the talk-back channel to instead respond to communications received on the non-primary channel when the PTT switch is activated.

2. The method of claim 1, wherein prior to the determination that the second voice communication received on the non-primary channel comprises critical information, an audio associated with the second voice communication received on the non-primary channel is either muted or played at a volume that is lower than a volume of an audio played for the first communication received on the primary channel.

3. The method of claim 2, wherein in response to determining that the second voice communication received on the non-primary channel comprises critical information, the method further comprising:

switching audio associated with the second voice communication received on the non-primary channel to play at a volume that is higher than the volume of the audio played for the first communication received on the primary channel.

4. The method of claim 1, wherein controls of at least one user interface in the radio communication device are associated with the primary channel for controlling one or more operational parameters pertaining to the primary channel, and further wherein, in response to determining that the second voice communication comprises critical information, the method further comprising:

switching functionality of the controls of the at least one user interface in the radio communication device to control one or more operational parameters pertaining to the non-primary channel; and in response to receiving a user input at the controls of the at least user interface, controlling one or more operational parameters pertaining to the non-primary channel in accordance with the received input.

5. The method of claim 1, wherein determining, based on a content of the text message, whether the second voice communication received on the non-primary channel comprises critical information, comprises:

associating the text message with additional information comprising at least a timestamp of arrival of the second voice communication and a talkgroup identification (ID);

comparing the timestamp and talkgroup ID of the text message with a timestamp and talkgroup ID of at least one other text message corresponding to a previously processed voice communication;

comparing the content of the text message with the at least one other text message when the difference between the timestamps is smaller than a threshold value and further the talkgroup ID of the text message matches with the talkgroup ID of the at least one other text message; and determining that the second voice communication received on the non-primary channel comprises critical information when the content of the text message and the at least one other text message co-relate to each other.

6. The method of claim 1, wherein determining, based on a content of the text message, whether the second voice communication received on the non-primary channel comprises critical information, comprises:

extracting one or more keywords from the text message associated with the second voice communication;

comparing the extracted one or more keywords with one or more user-defined critical keywords stored in a database; and determining that the second voice communication received on the primary channel comprises critical information when the extracted one or more keywords match with one or more pre-defined critical keywords.

7. The method of claim 1, wherein in response to determining that the second voice communication received on the non-primary channel comprises critical information, activating a visual or audible alert in the radio communication device to indicate that a potential critical situation has occurred.

8. The method of claim 7, wherein prior to switching to the talk-back channel to respond to communications received on the non-primary channel, receiving confirmation at an user interface on the occurrence of the potential critical situation.

9. The method of claim 1, further comprising:

determining whether an acknowledgment is transmitted on the talk-back channel for responding to communications on the non-primary channel within a pre-defined time period since the radio communication device switched to the talk-back channel for responding to communications on the non-primary channel; and discarding the recorded voice communication from the text message buffer when an acknowledgment is transmitted within the pre-defined time period since the talk-back channel is switched for responding to communications on the non-primary channel.

10. A radio communication device, comprising:

at least one receiver for simultaneously receiving communications on a plurality of channels comprising a first communication on a primary channel and a second voice communication on a non-primary channel during a multi-watch mode of operation;

a transmitter for responding to communications received on the primary channel and on the non-primary channel via a talk-back channel, wherein the talk-back channel is enabled to respond to communications received on the primary channel by default when a push-to-talk (PTT) switch is activated; and a processor coupled to the at least one receiver and the transmitter, the processor configured to:

record the second voice communication in a text message buffer and convert the recorded second voice communication into a text message;

determine whether there is any transmission activity, determine, based on a content of the text message, whether the second voice communication received on the non-primary channel comprises critical information when there is no transmission activity for a predefined time period since the communication was received on the non-primary channel, and in response to determining that the second voice communication received on the non-primary channel comprises critical information, switch the talk-back channel to instead respond to communications received on the non-primary channel when the PTT switch is activated.

11. The radio communication device of claim 10, wherein the processor is further configured to, prior to the determination that the second voice communication received on the non-primary channel comprises critical information, cause an audio associated with the second voice communication on the non-primary channel to be either muted or played at a volume that is lower than a volume of an audio played for the first communication received on the primary channel.

12. The radio communication device of claim 11, wherein the processor is further configured to, in response to determining that the second voice communication received on the non-primary channel comprises critical information, switches the audio associated with the second voice communication received on the non-primary channel to play at a volume which is higher than the volume of the audio played for the first communication received on the primary channel.

13. The radio communication device of claim 10, further comprising at least one user interface, wherein the processor associates controls of the at least one user interface with the primary channel for controlling one or more operational parameters pertaining to the primary channel;

wherein the processor is further configured to, in response to determining that the second voice communication received on the non-primary channel comprises critical information, switch functionality of controls of the at least one user interface in the radio communication device to control one or more operational parameters pertaining to the non-primary channel.

14. The radio communication device of claim 13, wherein the at least one user interface comprises a volume control interface, and further wherein the one or more operational parameters comprise a volume parameter.

\* \* \* \* \*